United States Patent
Deng et al.

(10) Patent No.: US 10,813,101 B2
(45) Date of Patent: Oct. 20, 2020

(54) QOS RESOURCE ALLOCATION METHOD AND APPARATUS

(71) Applicant: Huawei Technologies Co., Ltd., Shenzhen (CN)

(72) Inventors: Yu Deng, Shanghai (CN); Chunyan Ma, Shenzhen (CN); Bin Xu, Shenzhen (CN); Minchang Yang, Shenzhen (CN); Songping Yao, Beijing (CN); Feng Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 58 days.

(21) Appl. No.: 16/301,297

(22) PCT Filed: May 10, 2016

(86) PCT No.: PCT/CN2016/081520
§ 371 (c)(1),
(2) Date: Nov. 13, 2018

(87) PCT Pub. No.: WO2017/193275
PCT Pub. Date: Nov. 16, 2017

(65) Prior Publication Data
US 2019/0357220 A1 Nov. 21, 2019

(51) Int. Cl.
*H04W 28/24* (2009.01)
*H04W 4/24* (2018.01)
*H04W 72/08* (2009.01)

(52) U.S. Cl.
CPC ........... *H04W 72/08* (2013.01); *H04W 28/24* (2013.01)

(58) Field of Classification Search
CPC . H04L 12/1407; H04L 41/0896; H04L 65/80; H04L 12/14; H04L 12/1457;
(Continued)

(56) References Cited

U.S. PATENT DOCUMENTS

2011/0317718 A1* 12/2011 Siddam ............... H04L 12/1407
370/468
2012/0059944 A1* 3/2012 Fernandez Alonso ......................
H04L 12/14
709/228
(Continued)

FOREIGN PATENT DOCUMENTS

CN 101827411 A 9/2010
CN 102711260 A 10/2012
(Continued)

OTHER PUBLICATIONS

Machine Translation and Abstract of Chinese Publication No. CN103024824, Apr. 3, 2013, 33 pages.
(Continued)

*Primary Examiner* — Sai Aung
(74) *Attorney, Agent, or Firm* — Conley Rose, P.C.

(57) ABSTRACT

A quality of service (QoS) resource allocation method and apparatus, where the method includes receiving service information from a terminal, sending a QoS resource request message that carries the service information to a policy and charging rules function (PCRF) corresponding to the terminal, where the QoS resource request message requesting the PCRF to allocate a QoS resource to a terminal service, and receiving a request response message from the PCRF indicating whether the QoS resource is successfully allocated to the terminal service. The terminal can recognize the service information of the terminal service, and a specific implementation of sending, to the PCRF, the service information of the terminal service recognized by the terminal is put forward such that accuracy of a policy formulated by the PCRF is improved.

20 Claims, 5 Drawing Sheets

(58) Field of Classification Search
CPC ............ H04L 41/0893; H04L 41/5022; H04L 41/5029; H04L 47/805; H04L 47/824; H04L 65/1063; H04L 65/1083; H04L 65/4084

See application file for complete search history.

(56) References Cited

U.S. PATENT DOCUMENTS

| | | | |
|---|---|---|---|
| 2012/0163369 A1* | 6/2012 | Draznin | H04W 76/10 370/352 |
| 2014/0064070 A1 | 3/2014 | Paladugu et al. | |
| 2014/0187195 A1 | 7/2014 | Pallares Lopez et al. | |
| 2014/0351442 A1* | 11/2014 | Fernandez-Palacios | H04L 41/0896 709/226 |
| 2016/0135166 A1* | 5/2016 | Cilli | H04W 8/24 370/329 |
| 2016/0330647 A1* | 11/2016 | Iwai | H04W 28/0268 |
| 2017/0027012 A1 | 1/2017 | Chat et al. | |

FOREIGN PATENT DOCUMENTS

| | | |
|---|---|---|
| CN | 103024824 A | 4/2013 |
| CN | 103037448 A | 4/2013 |
| CN | 103139849 A | 6/2013 |
| CN | 103379043 A | 10/2013 |
| CN | 103686877 A | 3/2014 |
| CN | 104144128 A | 11/2014 |
| CN | 104168254 A | 11/2014 |
| CN | 104685921 A | 6/2015 |
| CN | 105207787 A | 12/2015 |
| WO | 2013044730 A1 | 4/2013 |

OTHER PUBLICATIONS

Machine Translation and Abstract of Chinese Publication No. CN105207787, Dec. 30, 2015, 44 pages.

Foreign Communication From a Counterpart Application, Chinese Application No. 201680028341.7, Chinese Office Action dated May 29, 2019, 8 pages.

Machine Translation and Abstract of Chinese Publication No. CN102711260, Oct. 3, 2012, 16 pages.

Machine Translation and Abstract of Chinese Publication No. CN103379043, Oct. 30, 2013, 20 pages.

Machine Translation and Abstract of Chinese Publication No. CN103686877, Mar. 26, 2014, 17 pages.

Machine Translation and Abstract of Chinese Publication No. CN104168254, Nov. 26, 2014, 16 pages.

Machine Translation and Abstract of International Publication No. WO2013044730, Apr. 4, 2013, 37 pages.

Foreign Communication From a Counterpart Application, PCT Application No. PCT/CN2016/081520, English Translation of International Search Report dated Jan. 26, 2017, 2 pp.

Foreign Communication From a Counterpart Application, PCT Application No. PCT/CN2016/081520, English Translation of Written Opinion dated Jan. 26, 2017, 3 pages.

"3rd Generation Partnership Project; Technical Specification Group Services and System Aspects; Policy and charging control architecture (Release 13)," XP051086100, 3GPP TS 23.203, V13.7.0, Mar. 2016, 242 pages.

"3rd Generation Partnership Project; Technical Specification Group Core Network and Terminals; Policy and Charging Control signalling flows and Quality of Service (QoS) parameter mapping (Release 12)," XP051088208, 3GPP TS 29.213, V12.11.0, Mar. 2016, 206 pages.

"3rd Generation Partnership Project; Technical Specification Group Core Network and Terminals; Policy and Charging Control over Rx reference point (Release 12)," XP051088209, 3GPP TS 29.214, V12.11.0, Mar. 2016, 61 pages.

Foreign Communication From A Counterpart Application, European Application No. 16901230.9, Extended European Search Report dated Feb. 21, 2019, 10 pages.

* cited by examiner

QOS RESOURCE ALLOCATION METHOD AND APPARATUS

CROSS-REFERENCE TO RELATED APPLICATIONS

This application is a U.S. National Stage of international Patent Application No. PCT/CN2016/081520 filed on May 10, 2016, which is hereby incorporated by reference in its entirety.

TECHNICAL FIELD

The present invention relates to communications technologies, and in particular, to a QoS resource allocation method and apparatus.

BACKGROUND

The 3rd Generation Partnership Project (3rd Generation Partnership Project, 3GPP for short) standard organization formulates a policy and charging control (Policy and Charging Control, PCC for short) architecture. A policy and charging control unit (Policy and Charging Rules Function, PCRF for short) network element in the PCC architecture may separately formulate, for different terminals, control policies used to provide service flow bearer resource insurance and charging control, to implement differentiated services on the different terminals, so as to properly use network resources.

In an existing PCC architecture, the PCRF needs to formulate a control policy with reference to information such as terminal service information. In the prior art, the terminal service information is obtained by parsing a terminal service data flow. However, with a requirement for network security, a service data flow sent by a terminal by using a network is encrypted, and therefore the terminal service information cannot be obtained by using the foregoing method. In this case, the terminal service information may be obtained by recognizing a to-be-performed service by the terminal. However, in a current communications standard, a solution of how the terminal sends terminal service information recognized by the terminal to the PCRF has not been provided.

SUMMARY

Embodiments of the present invention provide a QoS resource allocation method and apparatus, to resolve a prior-art problem that service information of a terminal service cannot be sent to a PCRF after being recognized by using a terminal.

A first aspect of the present invention provides a QoS resource allocation method, including: First, service information that is of a terminal service and that is sent by a terminal is received; then, a quality of service QoS resource request message that carries the service information is sent to a policy and charging rules function PCRF unit corresponding to the terminal, where the QoS resource request message is used to request the PCRF to allocate a QoS resource to the terminal service; and finally, a request response message that is sent by the PCRF and that is used to indicate whether the QoS resource is successfully allocated to the terminal service is received.

In this embodiment, the terminal can recognize the service information of the terminal service, so that a prior-art problem that the service information of the terminal service cannot be recognized from an encrypted service data flow can be resolved. A specific implementation of sending, to the PCRF, the service information that is of the terminal service and that is recognized by the terminal is put forward, so that accuracy of a policy formulated by the PCRF is improved.

In some embodiments of the first aspect, the service information includes at least one of the following information: a source port number of the terminal service, a destination port number of the terminal service, a source IP address of the terminal service, destination IP address network address information of the terminal service, a transmission protocol of the terminal service, or a service identifier of the terminal service.

In this embodiment, the terminal may add any information related to the terminal service to the service information, and finally send the service information to a PCRF having a specified policy. Therefore, another network element does not need to determine the service information of the terminal service, so that not only terminal service recognition accuracy is effectively improved, but the accuracy of the policy formulated by the PCRF and real-time performance of the policy formulated by the PCRF are also improved.

In some embodiments of the first aspect, the service information further includes at least one of the following information: a priority of the terminal service, preconfigured bandwidth of the terminal service, or binding duration of the terminal service.

In this embodiment, the service information sent by the terminal may carry configuration information of the terminal service. Therefore, an AF can directly send, to the PCRF, the service information that carries the configuration information of the terminal service, and the AF does not need to search, according to the service information of the terminal service, for preconfiguration information corresponding to the terminal service from locally-stored preconfiguration information, so that the real-time performance of the policy formulated by the PCRF is effectively improved.

In some embodiments of the first aspect, before the receiving service information sent by a terminal, the method further includes: sending configuration information of the terminal service to the terminal, where the configuration information of the terminal service includes at least one of the following information: a priority of the terminal service, preconfigured bandwidth of the terminal service, or binding duration of the terminal service.

In some embodiments of the first aspect, the service information further includes the configuration information of the terminal service.

In this embodiment, the service information of the terminal service and the preconfiguration information corresponding to the terminal service may be sent to the terminal. Therefore, the service information sent by the terminal may carry the configuration information that is of the terminal service and that is included in the service information, and finally, the AF can directly send, to the PCRF, the service information that carries the configuration information of the terminal service, and the AF does not need to search, according to the service information of the terminal service, for the preconfiguration information corresponding to the terminal service from the locally-stored preconfiguration information, so that the real-time performance of the policy formulated by the PCRF is effectively improved.

In some embodiments of the first aspect, the service information further includes an identifier of the terminal, and the sending a QoS resource request to a PCRF corresponding to the terminal specifically includes: first, determining, according to the identifier of the terminal and an address relationship table, address information of the PCRF corresponding to the terminal, where the foregoing address relationship table includes a correspondence between the identifier of the terminal and the address information of the PCRF corresponding to the terminal; and then, sending, according to the address information of the PCRF corresponding to the terminal, the QoS resource request message to the PCRF corresponding to the address information of the PCRF corresponding to the terminal.

In this embodiment, the PCRF corresponding to the terminal may be found according to the identifier of the terminal, so that the service information sent by the terminal is added to the QoS resource request message and the QoS resource request message is sent to the PCRF corresponding to the terminal. Therefore, the accuracy of the policy formulated by the PCRF is improved.

In some embodiments of the first aspect, before the determining, according to the identifier of the terminal and an address relationship table, address information of the PCRF corresponding to the terminal, the method further includes: receiving a notification message that carries the address information of the PCRF corresponding to the terminal and the identifier of the terminal and that is sent by the PCRF corresponding to the terminal; and then, obtaining the address relationship table according to the identifier of the terminal and the address information of the PCRF corresponding to the terminal.

In this embodiment, when the PCRF corresponding to the terminal is determined according to the identifier of the terminal, the correspondence between the identifier of the terminal and the PCRF corresponding to the terminal needs to be learned in advance, that is, the foregoing address relationship table is obtained. In this case, when the PCRF corresponding to the terminal sends the correspondence between the identifier of the terminal and the PCRF corresponding to the terminal, to obtain the foregoing address relationship table, accuracy of determining the PCRF corresponding to the terminal can be improved.

In some embodiments of the first aspect, the method may further include: receiving a request message that is sent by the terminal and that carries the service information of the terminal service, where the request message is used to request release of the QoS resource allocated to the terminal service; then, sending a QoS resource release request message to the PCRF corresponding to the terminal; and finally, receiving a release response message sent by the PCRF corresponding to the terminal, and forwarding the release response message to the terminal, where the release response message is used to indicate that the QoS resource allocated to the terminal service has been released.

In this embodiment, when the terminal service needs to be stopped, that is, when the PCRF needs to release the QoS resource allocated to the terminal service, the terminal may actively send the request message used to request release of the QoS resource allocated to the terminal service. Therefore, the QoS resource allocated to the terminal service can be released in real time, a case in which the QoS resource allocated to the terminal service is still occupied after the terminal service is stopped is avoided, and utilization of the QoS resource is effectively improved.

A second aspect of the present invention provides a QoS resource allocation apparatus, including:

a receiving module, configured to receive service information that is of a terminal service and that is sent by a terminal; and a sending module, configured to send a quality of service QoS resource request message to a policy and charging rules function PCRF unit corresponding to the terminal, where the QoS resource request message carries the service information, and the QoS resource request message is used to request the PCRF to allocate a QoS resource to the terminal service; where the receiving module is further configured to receive a request response message sent by the PCRF, where the request response message is used to indicate whether the QoS resource is successfully allocated to the terminal service.

In some embodiments of the second aspect, the service information includes at least one of the following information: a source port number of the terminal service, a destination port number of the terminal service, a source IP address of the terminal service, destination IP address network address information of the terminal service, a transmission protocol of the terminal service, or a service identifier of the terminal service.

In some embodiments of the second aspect, the service information further includes at least one of the following information: a priority of the terminal service, preconfigured bandwidth of the terminal service, or binding duration of the terminal service.

In some embodiments of the second aspect, the sending module is further configured to send configuration information of the terminal service to the terminal before the receiving module receives the service information sent by the terminal, where the configuration information of the terminal service includes at least one of the following information: a priority of the terminal service, preconfigured bandwidth of the terminal service, or binding duration of the terminal service.

In some embodiments of the second aspect, the service information further includes the configuration information of the terminal service.

In some embodiments of the second aspect, the service information further includes an identifier of the terminal, and the apparatus further includes a determining module; where the determining module is configured to determine, according to the identifier of the terminal and an address relationship table, address information of the PCRF corresponding to the terminal, where the address relationship table includes a correspondence between the identifier of the terminal and the address information of the PCRF corresponding to the terminal; and when sending the QoS resource request message to the PCRF corresponding to the terminal, the sending module is configured to send, according to the address information of the PCRF corresponding to the terminal, the QoS resource request message to the PCRF corresponding to the address information of the PCRF corresponding to the terminal.

In some embodiments of the second aspect, the receiving module is further configured to: before the determining module determines, according to the identifier of the terminal and the address relationship table, the address information of the PCRF corresponding to the terminal, receive a notification message sent by the PCRF corresponding to the terminal, where the notification message carries the address information of the PCRF corresponding to the terminal and the identifier of the terminal; and the determining module is further configured to obtain the address relationship table according to the identifier of the terminal and the address information of the PCRF corresponding to the terminal.

In some embodiments of the second aspect, the receiving module is further configured to receive a request message sent by the terminal, the request message carries the service information of the terminal service, and the request message is used to request release of the QoS resource allocated to the terminal service;

the sending module is further configured to send a QoS resource release request message to the PCRF corresponding to the terminal; and the receiving module is further configured to: receive a release response message sent by the PCRF corresponding to the terminal, and forward the release response message to the terminal, where the release response message is used to indicate that the QoS resource allocated to the terminal service has been released.

A third aspect of the present invention provides a QoS resource allocation apparatus, including:

a receiver, configured to receive service information that is of a terminal service and that is sent by a terminal; and a transmitter, configured to send a quality of service QoS resource request message to a policy and charging rules function PCRF unit corresponding to the terminal, where the QoS resource request message carries the service information, and the QoS resource request message is used to request the PCRF to allocate a QoS resource to the terminal service; where the receiver is further configured to receive a request response message sent by the PCRF, where the request response message is used to indicate whether the QoS resource is successfully allocated to the terminal service.

In some embodiments of the third aspect, the service information includes at least one of the following information: a source port number of the terminal service, a destination port number of the terminal service, a source IP address of the terminal service, destination IP address network address information of the terminal service, a transmission protocol of the terminal service, or a service identifier of the terminal service.

In some embodiments of the third aspect, the service information further includes at least one of the following information: a priority of the terminal service, preconfigured bandwidth of the terminal service, or binding duration of the terminal service.

In some embodiments of the third aspect, the transmitter is further configured to send configuration information of the terminal service to the terminal before the receiver receives the service information sent by the terminal, where the configuration information of the terminal service includes at least one of the following information: a priority of the terminal service, preconfigured bandwidth of the terminal service, or binding duration of the terminal service.

In some embodiments of the third aspect, the service information further includes the configuration information of the terminal service.

In some embodiments of the third aspect, the service information further includes an identifier of the terminal, and the apparatus further includes a processor; where the processor is configured to determine, according to the identifier of the terminal and an address relationship table, address information of the PCRF corresponding to the terminal, where the address relationship table includes a correspondence between the identifier of the terminal and the address information of the PCRF corresponding to the terminal; and when sending the QoS resource request message to the PCRF corresponding to the terminal, the transmitter is configured to send, according to the address information of the PCRF corresponding to the terminal, the QoS resource request message to the PCRF corresponding to the address information of the PCRF corresponding to the terminal.

In some embodiments of the third aspect, the receiver is further configured to: before the processor determines, according to the identifier of the terminal and the address relationship table, the address information of the PCRF corresponding to the terminal, receive a notification message sent by the PCRF corresponding to the terminal, where the notification message carries the address information of the PCRF corresponding to the terminal and the identifier of the terminal; and the processor is further configured to obtain the address relationship table according to the identifier of the terminal and the address information of the PCRF corresponding to the terminal.

In some embodiments of the third aspect, the receiver is further configured to receive a request message sent by the terminal, the request message carries the service information of the terminal service, and the request message is used to request release of the QoS resource allocated to the terminal service;

the transmitter is further configured to send a QoS resource release request message to the PCRF corresponding to the terminal; and the receiver is further configured to: receive a release response message sent by the PCRF corresponding to the terminal, and forward the release response message to the terminal, where the release response message is used to indicate that the QoS resource allocated to the terminal service has been released.

The embodiments of the present invention provide the QoS resource allocation method. The method includes: First, the service information sent by the terminal is received; then, the QoS resource request message that carries the service information is sent to the PCRF corresponding to the terminal, where the QoS resource request message is used to request the PCRF to allocate the QoS resource to the terminal service; and finally, the request response message that is sent by the PCRF and that is used to indicate whether the QoS resource is successfully allocated to the terminal service is received. The terminal can recognize the service information of the terminal service, so that a prior-art problem that the service information of the terminal service cannot be recognized from an encrypted service data flow can be resolved. A specific implementation of sending, to the PCRF, the service information that is of the terminal service and that is recognized by the terminal is put forward, so that the accuracy of the policy formulated by the PCRF is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

The technical solutions of the present invention may be applied to various communications systems, such as the Global System for Mobile Communications (Global System for Mobile communications, GSM for short), a Code Division Multiple Access (Code Division Multiple Access, CDMA for short) system, a Wideband Code Division Multiple Access (Wideband Code Division Multiple Access, WCDMA for short) system, and a Long Term Evolution (Long Term Evolution, LTE for short) system.

With rapid development of communications technologies, a communications network is evolving into a multimedia network of all Internet Protocols IP. An operator constantly develops various communications services based on an IP network, such as communications services of multimedia calling, file downloading, website browsing, and video on demand.

Different communications services have different requirements for quality of service (Quality of Service, QoS for short), and different communications services also have different charging requirements. Therefore, a network provides differentiated QoS services for a user according to a service type of a communications service and a subscription class of the user, and reports charging information such as service traffic and duration to a charging center by means of service detection, and the charging center performs charging.

To implement related problems such as the foregoing QoS service and service flowbased charging, the 3rd Generation Partnership Project (3rd Generation Partnership Project, 3GPP for short) organization defines a policy and charging control (Policy and Charging Control, PCC for short) architecture.

Figure 1:
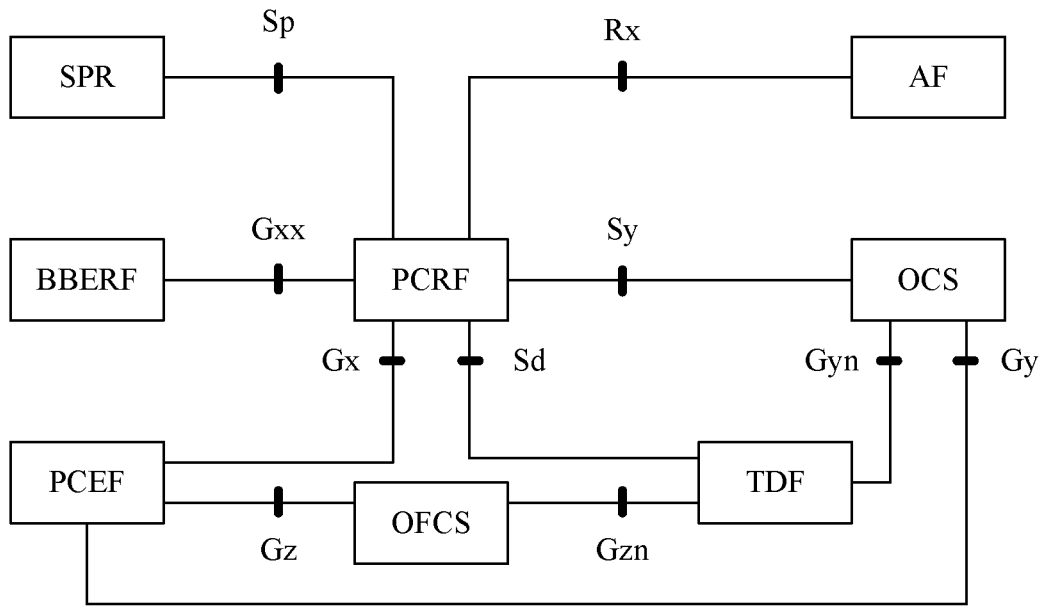
FIG. 1 is a schematic diagram of a PCC architecture defined in the 3GPP.

FIG. 1 is a schematic diagram of a PCC architecture defined in the 3GPP. As shown in FIG. 1, the PCC architecture includes an application function, a policy and charging rules function, a bearer binding and event reporting function, a subscription profile repository, an online charging system, an offline charging system, a TDF, and a policy and charging enforcement function.

The application function (Application Function, AF for short) is used to provide service information required by a control policy specified by a service, such as information of an Internet Protocol (Internet Protocol, IP for short) address used for service implementation, a port number, bandwidth required for the service implementation, and a priority of the service.

The policy and charging rules function (Policy and Charging Rules Function, PCRF for short) formulates a QoS and charging policy for using a network resource by the service. The PCRF needs to formulate the control policy with reference to the service information received from the AF, user subscription information received from a subscription profile repository (Subscription Profile Repository, SPR for short), a policy configured by an operator, and the like. The PCRF delivers the control policy formulated for the service to a policy and charging enforcement function (Policy and Charging Enforcement Function, PCEF for short) or a bearer binding and event reporting function (Bearer Binding and Event Report Function, BBERF for short) for execution. In addition, the PCRF may subscribe to a bearer layer-related event from the PCEF and/or the BBERF, to perceive the event in time when the event occurs at a bearer layer, and change the control policy.

The PCEF is used to perform a PCC rule delivered by the PCRF or preconfigured on the PCEF, and binds the rule to a bearer that matches the rule. The PCEF detects, according to quintuple information included in the PCC rule, an IP packet transmitted on a network, and when the IP packet matches a quintuple in a rule, performs corresponding QoS and charging control on the IP packet according to the rule. In addition, when the PCRF subscribes to a related bearer layer event from the PCEF, and when the event occurs, the PCEF needs to report the event to the PCRF in time.

When the network uses a proxy mobility IP (Proxy Mobility Internet Protocol, PMIP for short) or a dual-stack mobility IP (Dual Stack Mobility Internet Protocol, DSMIP for short), the network needs to configure a BBERF function.

The BBERF primarily receives a QoS rule delivered by the PCRF, and binds the rule to a bearer that matches the rule. The BBERF detects, according to quintuple information included in the rule, an IP packet transmitted on the network, and when the IP packet matches the quintuple, performs a QoS control policy defined in the rule on the IP packet. In addition, when the PCRF subscribes to a related bearer layer event from the BBERF, and when the event occurs, the BBERF needs to report the event to the PCRF in time.

The SPR is used to store the user subscription information, formulate a PCC rule for the PCRF, and provide necessary user subscription information.

The online charging system (Online Charging System, OCS for short) is a system that performs, in real time, interactive charging based on service use and a system. Online charging is to collect charging information in a session process, and implement real-time settlement.

The offline charging system (Offline Charging System, OFCS for short) provides a charging function that is based on a user and a service data flow, and main functions include a customer service, business management, billing, settlement, accounting processing, system management, and the like. The offline charging system is a postpaid processing system that is for a bill and an account.

Further, in the schematic diagram of the PCC architecture shown in FIG. 1, the PCRF is connected to the AF, the SPR, the BBERF, and the PCRF respectively by using an Rx interface, an Sp interface, a Gxx interface, and a Gx interface. The BBERF may be located in an access network gateway (Access Network Gateway, AN-GW for short), and the PCEF may be located in a public data network gateway (Public Data Network Gateway, PDN-GW for short). The PCEF is connected to the online charging system (Online Charging System, OCS for short) and the offline charging system (Offline Charging System, OFCS for short) respectively by using a Gy interface and a Gz interface. The TDF is connected to the OFCS and the OCS respectively by using a Gzn interface and a Gyn interface.

A procedure of implementing policy control on a service transmitted on a bearer network in the PCC architecture shown in FIG. 1 is as follows:

First, before the user formally implements a specific service, the PCRF needs to respectively establish a gateway control session and an IP-connectivity access network (IP-Connectivity Access Network, IP-CAN for short) session with the BBERF and the PCEF, and establish association between the gateway control session and the IP-CAN session, to ensure consistency of implementing control policies on the BBERF and the PCEF for a particular service data flow.

Then, in a service implementation process, the PCRF formulates, according to application layer negotiation service information, user subscription information, an operator policy, and the like, a corresponding policy for a service data flow included in the service, including information such as authorized bandwidth and quintuple information that is used for identifying a service flow, delivers the policy to the BBERF in a form of a QoS rule, and delivers the policy to the PCEF in a form of a PCC rule. When an IP packet arrives at the PCEF or the BBERF, the PCEF or the BBERF first matches the IP packet according to the quintuple information in the rule, transmits the matched IP packet by using a corresponding bearer, and performs corresponding charging, to effectively control the service. In addition, when service information changes in the service implementation process, for example, a service data flow is ended, a QoS resource occupied by the service may also be released in real time by means of PCC, so that dynamic QoS resource control is performed on the service.

In the prior art, before formulating a corresponding policy for a service data flow included in a service, a PCRF further needs to know service information corresponding to the service, so as to formulate a related policy with reference to the service information and other information. A prior-art implementation method for obtaining the service information corresponding to the service is as follows: A deep packet inspection (Deep Packet Inspection, DPI for short) function built in a PCEF is used to recognize the service, to obtain a key word of a terminal service from a service data flow sent by a terminal by using a network, and obtain service information of the terminal service according to the key word of the terminal service; and then the service information is reported to the PCRF, and the PCRF determines a policy with reference to the other information, and delivers a generated rule to the PCEF, to perform differentiated QoS control on a user. Another prior-art implementation method is as follows: An AF recognizes a terminal service to obtain service information of the terminal service, then the AF reports the service information of the terminal service to the PCRF by using an Rx interface, and the PCRF determines a policy with reference to the other information, and delivers a generated rule to a PCEF, to perform differentiated QoS control on a user.

However, with a requirement for network security, the service data flow sent by the terminal by using the network is encrypted, and therefore, the PCEF or the AF cannot obtain the key word related to the terminal service from the service data flow sent by the terminal by using the network, and cannot obtain the service information of the terminal service.

A current main means for resolving the foregoing problem is to recognize the service information of the terminal service by using a port number. However, a port number corresponding to a same service is not fixed, and therefore, although the method can resolve the problem that the PCEF or the AF cannot obtain the service information of the terminal service from the encrypted service data flow sent by the terminal by using the network, accuracy is relatively low, and consequently the policy formulated by the PCRF is not accurate.

The inventor finds from researches that the service information of the terminal service may be obtained by recognizing the terminal service by the terminal. However, in a current communications standard, a solution of how the terminal sends terminal service information recognized by the terminal to the PCRF has not been provided. To resolve this problem, the present invention provides a solution in which the terminal recognizes the terminal service to obtain the service information of the terminal service and reports the service information to the PCRF.

It should be noted that, in actual application, the terminal may directly send the obtained service information of the terminal service to the PCRF, or send the service information to the PCRF by using another network element such as the PCRF or the TDF on a core network side. However, because there is an excessively large quantity of network elements such as the PCEF and the TDF on the core network side, if the method of the present invention is implemented by using these network elements, networking is relatively complex, relatively strong impact is exerted on an entire network architecture, and feasibility is relatively low. Because there is a relatively small quantity of AFs in the existing network architecture, if the method of the present invention is implemented by using the AF, the impact exerted on the existing network architecture can be avoided, and networking is not excessively complex.

In an example for description in the following embodiments, the service information that is of the terminal service and that is obtained by the terminal is sent to the PCRF by using the AF.

Figure 2:
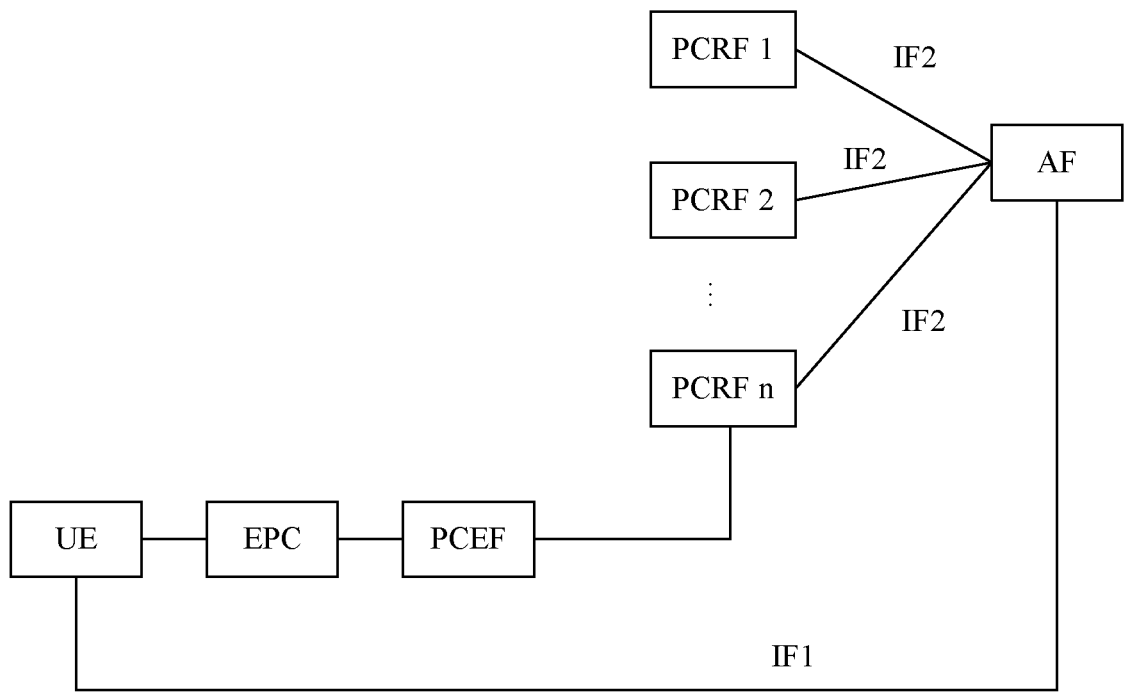
FIG. 2 is a diagram of an actual architecture of the present invention.

FIG. 2 is a diagram of an actual architecture of the present invention. As shown in FIG. 2, a new logical interface IF1 is added between a terminal and an AF, and a new logical interface IF2 is added between the AF and a PCRF.

A function of recognizing the terminal service may be newly added to the terminal in this architecture diagram, to obtain service information of the terminal service.

The interface IF1 is newly added between the terminal and the AF, to report the service information and the like that are of the terminal service and that are obtained by the terminal. The AF is responsible for sending, by using an existing Gx interface, the service information of the terminal service and configuration information of the terminal service to a PCRF corresponding to the terminal. Policy control is still delivered by the PCRF. In addition, the AF sends the configuration information of the terminal service to the terminal by using the interface IF1.

The interface IF2 is newly added between the PCRF and the AF, so that the PCRF reports, in real time, a PCRF address of a PCRF on which the terminal is currently located to the AF. The AF records a correspondence between the terminal and the PCRF address according to information reported by the PCRF, to send a subsequent QoS resource request message and a subsequent QoS resource release request message to the corresponding PCRF.

Specific embodiments are used below to describe the technical solutions of the present invention in detail. The following several specific embodiments may be combined with each other, and a same or similar concept or process may not be described repeatedly in some embodiments.

Figure 3:
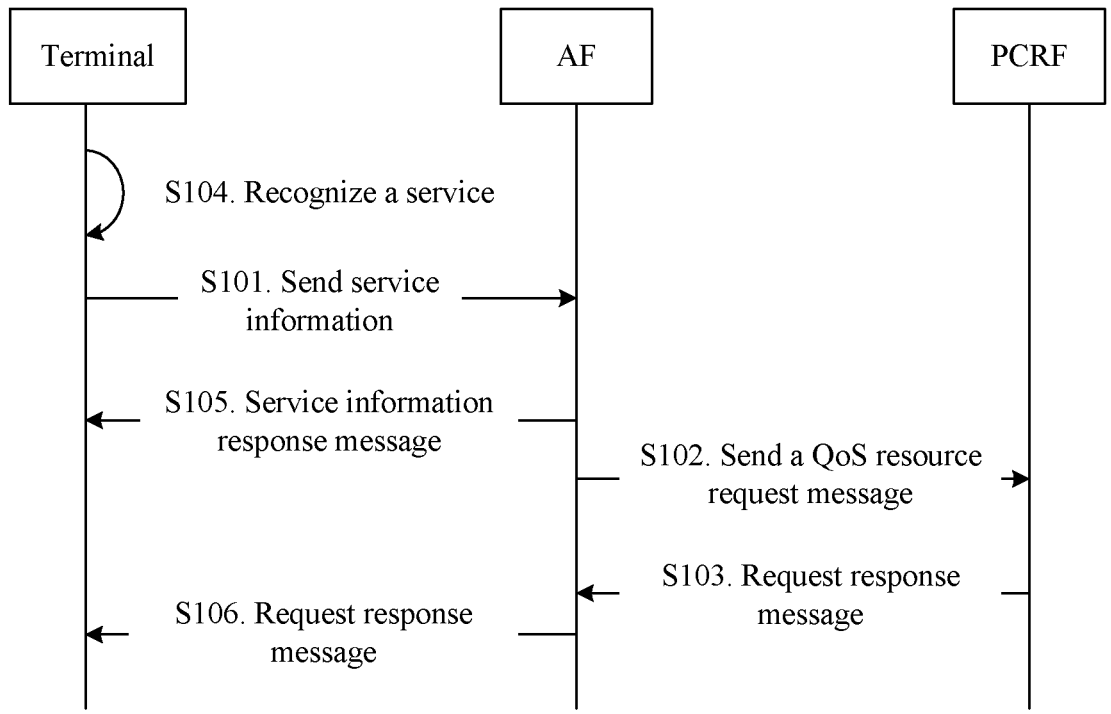
FIG. 3 is a flowchart of a QoS resource allocation method according to an embodiment of the present invention.

FIG. 3 is a flowchart of a QoS resource allocation method according to Embodiment 1 of the present invention. As shown in FIG. 1, the method in this embodiment may include the following steps.

S101. A terminal sends service information of a terminal service to an AF.

S102. The AF sends a quality of service QoS resource request message to a policy and charging rules function PCRF unit corresponding to the terminal, where the QoS resource request message carries the service information in S101, and the QoS resource request message is used to request the PCRF to allocate a QoS resource to the terminal service.

In an implementation, the service information that is of the terminal service and that is sent by the terminal to the AF includes at least one of the following information: at least one type of information in quintuple information of the terminal service, or a service identifier of the terminal service. The quintuple information of the terminal service is a source port number of the terminal service, a destination port number of the terminal service, a source IP address of the terminal service, a destination IP address of the terminal service, and a transmission protocol of the terminal service.

After receiving the service information sent by the terminal, the AF determines configuration information of the terminal service according to a preconfiguration message locally stored on the AF and the service information sent by the terminal, then adds the service information and the configuration information of the terminal service to the QoS resource request message, and sends the QoS resource request message to the PCRF corresponding to the terminal, so that the PCRF determines, according to the QoS resource request message, whether to allocate the QoS resource to the terminal service. The configuration information of the terminal service includes at least one of the following information: a priority of the terminal service, preset bandwidth of the terminal service, or binding duration of the terminal service. The binding duration of the terminal service is a sustainable time of the terminal service in the allocated QoS resource.

In an implementation of the present invention, to avoid a problem, in the foregoing step 102, that the AP has relatively large overheads because after receiving the service information sent by the terminal, the AF needs to determine the priority of the terminal service, the preset bandwidth of the terminal service, or the binding duration of the terminal service according to the preconfiguration message locally stored on the AF and the service information sent by the terminal, the AF may locally configure the service information.

In another implementation, the service information that is of the terminal service and that is sent by the terminal to the AF includes at least one of the following information: at least one type of information in quintuple information of the terminal service, a service identifier of the terminal service, or configuration information of the terminal service. Therefore, the AF can directly forward the service information to the PCRF after receiving the service information, so that overheads of the AF are effectively reduced, and a delay of allocating the QoS resource to the terminal is reduced. The configuration information of the terminal service may be set in the terminal by a user according to a user's requirement for the service, or may be preconfigured on the terminal.

In a still another implementation, before S101, the AF may further send configuration information of the terminal service to the terminal. The configuration information of the terminal service includes at least one of the following information: a priority of the terminal service, preconfigured bandwidth of the terminal service, or binding duration of the terminal service. Therefore, the service information sent by the terminal to the AF further includes the foregoing configuration information of the terminal service, and the AF can directly forward the service information to the PCRF after receiving the service information, so that overheads of the AF are effectively reduced, and a delay of allocating the QoS resource to the terminal is reduced.

In an implementation of the present invention, the AF may further send a QoS resource preconfiguration message to the terminal. The QoS resource preconfiguration message carries at least one of the following information: at least one type of information in quintuple information of the terminal service, or a correspondence between a service identifier of the terminal service and the configuration information of the terminal service. The configuration information of the terminal service includes at least one of the following information: a priority of the terminal service, preconfigured bandwidth of the terminal service, or binding duration of the terminal service. Therefore, the terminal may match any type of the service information of the terminal or the service identifier of the terminal service with information in the QoS resource preconfiguration message, to obtain the configuration information corresponding to the terminal service, so that the service information sent by the terminal to the AF further includes the foregoing configuration information corresponding to the terminal service. The AF can directly forward the service information to the PCRF after receiving the service information, so that overheads of the AF are effectively reduced, and a delay of allocating the QoS resource to the terminal is reduced.

For example, the terminal service may include a service 1 and a service 2, and the QoS resource preconfiguration message sent by the AF to the terminal includes a correspondence between quintuple information of the service 1 and configuration information of the service 1 and a correspondence between quintuple information of the service 2 and configuration information of the service 2. In this case, if the terminal service is the service 1, after obtaining the quintuple information of the service 1, the terminal determines the configuration information corresponding to the service 1 from the QoS resource preconfiguration message sent by the AF to the terminal, and then the terminal adds the configuration information corresponding to the terminal 1 to the service information, and sends the service information to the AF.

The foregoing QoS resource preconfiguration message carries the foregoing information of all services that can be performed by the terminal.

The AF may send the QoS resource preconfiguration message to the terminal in the following scenarios:

1. The terminal is started for a first time and a registration process on a cloud server is completed.

After being started for the first time, the terminal searches, according to a domain name in the terminal, for a domain name server corresponding to the domain name in the terminal, obtains an IP address of the cloud server from the domain name server, logs in to the cloud server by using the IP address, and completes a registration process on the cloud server. After completing the registration, the AF can send the QoS resource preconfiguration message to the terminal.

2. After a SIM card is changed in the terminal, the AF needs to send the QoS resource preconfiguration message to the terminal again because an IMSI of the terminal is changed.

3. The preconfiguration message stored in the AF changes.

4. The preconfiguration message stored in the AF does not include the service identifier of the service information sent by the terminal to the AF.

If the terminal has stored the QoS resource preconfiguration message, after receiving again the QoS resource preconfiguration message sent by the terminal, the terminal updates, according to a recently received QoS resource preconfiguration message, the QoS resource preconfiguration message locally stored in the terminal.

In this case, a scenario in which the AF sends the QoS resource preconfiguration message to the terminal may further include:

5. The foregoing update fails, second update is enabled, and in this case, the AF sends the QoS resource preconfiguration message to the terminal.

A quantity of retries in the scenario 5 may be preset according to an actual situation, and this is not limited in the present invention.

The PCRF corresponding to the terminal may be understood as that when the terminal is in an area of a specific PCRF, the PCRF is the PCRF corresponding to the terminal.

S103. The PCRF sends a request response message to the AF, where the request response message is used to indicate whether the QoS resource is successfully allocated to the terminal service.

After receiving the QoS resource request message sent by the AF, the PCRF subsequently completes a binding action stipulated in the 3GPP protocol, that is, completes a QoS class identifier (QoS Class Identifier, QCI for short), assured bandwidth (Guaranteed Bit Rate, GBR for short), and maximum bandwidth (Maximum Bit Rate, MBR for short). The QoS class identifier is used to indicate an identifier of a QoS feature of a service, and different QCI services need to use different bearers. The GBR indicates bandwidth that can be ensured and provided by one evolved packet core (Evolved Packet Core, EPC for short) bearer. The MBR indicates configuration of a parameter such as maximum bandwidth that can be provided by one EPC bearer.

After configuring the foregoing parameters, the PCRF sends the request response message to the AF, to indicate whether the QoS resource is successfully allocated to the terminal service.

In an implementation, the foregoing request response message may carry one cause value, and the cause value may be used to indicate whether the QoS resource is successfully allocated to the terminal service.

For example, the cause value may be 1 and 0. 1 indicates that the QoS resource is successfully allocated to the terminal service, and 0 indicates that the QoS resource fails to be allocated to the terminal service.

In another implementation, that the QoS resource request message in the foregoing step 102 is a resource binding request message in an existing standard is still used as an example. When the PCRF does not allocate bandwidth that is the same as the preset bandwidth carried in the QoS resource request message, the request response message may not only carry the reason value to indicate that the preset bandwidth in the resource binding request message fails to be allocated to the terminal service, but may also carry actually available bandwidth allocated by the PCRF to the terminal service.

It should be noted that, the foregoing parameters configured by the PCRF are only examples. In actual application, a parameter that needs to be configured by the PCRF may be determined according to the 3GPP standard or another requirement. This is not limited in the present invention.

In the prior art, to resolve a prior-art problem that a policy formulated by a PCRF is not accurate, a solution that a terminal is used to obtain service information of a terminal service is put forward. Based on the solution, the present invention puts forward a specific implementation of how the service information that is of the terminal service and that is obtained by the terminal is sent to the PCRF.

The binding duration that is of the terminal service and that is in the configuration information of the terminal service is an optional parameter. When the configuration information of the terminal service does not include the binding duration of the terminal service, the terminal may determine binding duration of a current service of the terminal according to an actual requirement of the current service. For example, if the terminal service is a movie service, the terminal can use play duration of the movie as the binding duration of the terminal service.

This embodiment of the present invention provides the QoS resource allocation method. The method includes: First, the service information sent by the terminal is received; then, the QoS resource request message that carries the service information is sent to the PCRF corresponding to the terminal, where the QoS resource request message is used to request the PCRF to allocate the QoS resource to the terminal service; and finally, the request response message that is sent by the PCRF and that is used to indicate whether the QoS resource is successfully allocated to the terminal service is received. The terminal can recognize the service information of the terminal service, so that a prior-art problem that the service information of the terminal service cannot be recognized from an encrypted service data flow can be resolved. A specific implementation of sending, to the PCRF, the service information that is of the terminal service and that is recognized by the terminal is put forward, so that accuracy of a policy formulated by the PCRF is improved.

Before sending the service information to the AF in S101, the terminal may further perform S104 shown in FIG. 3: The terminal recognizes the terminal service to obtain the service information to be sent to the AF. The service information includes at least one of the following information: a source port number of the terminal service, a destination port number of the terminal service, a source IP address of the terminal service, destination IP address network address information of the terminal service, a transmission protocol of the terminal service, or a service identifier of the terminal service.

In actual application, to enable the terminal to know, in time, whether the AF successfully receives the service information sent by the terminal, in an implementation, as shown in FIG. 3, after receiving the service information sent by the terminal, the AF may perform S105: The AF feeds back a service information response message to the terminal, where the service information response message is used to notify the terminal that the AF has successfully received the service information sent by the terminal. In another implementation, the AF may feed back a service information response message to the terminal after S102. On one hand, the service information response message in this case can be used to notify the terminal that the AF has successfully received the service information sent by the terminal. On the other hand, the service information response message in this case can not only be used to notify the terminal that the AF has successfully received the service information sent by the terminal, but can also be used to notify the terminal that the AF has sent the QoS resource request message to the PCRF according to the service information of the terminal.

Further, in an implementation, after receiving the request response message sent by the PCRF, the AF may further perform S106 shown in FIG. 3: The AF sends the request response message to the terminal, so that the terminal knows whether the QoS resource is successfully allocated to the terminal service.

Figure 4:
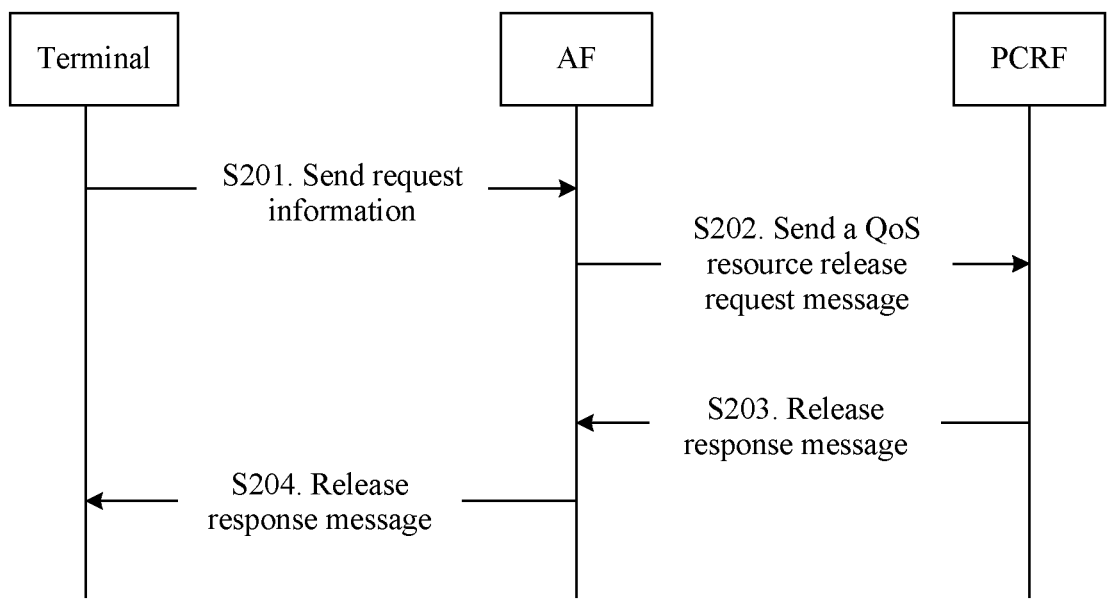
FIG. 4 is a flowchart of requesting, by a terminal, a PCRF to release a QoS resource allocated to a service that is currently being performed by the terminal according to an embodiment of the present invention.

If a terminal service stops before a terminal ensures that a duration timer does not expire, the terminal requires a PCRF to release a QoS resource allocated to a service that is currently being performed by the terminal. FIG. 4 is a flowchart of requesting, by a terminal, a PCRF to release a QoS resource allocated to a service that is currently being performed by the terminal according to an embodiment of the present invention. As shown in FIG. 4, the method includes the following steps:

S201. A terminal sends a request message to an AF, where the request message carries service information of a terminal service, and the request message is used to request release of a QoS resource allocated to the terminal service.

S202. After receiving the request message sent by the terminal, the AF sends a QoS resource release request message to a PCRF corresponding to the terminal.

S203. The PCRF corresponding to the terminal sends a release response message to the AF, where the release response message is used to indicate that the QoS resource allocated to the terminal service has been released.

S204. The AF receives the release response message sent by the PCRF corresponding to the terminal, and forwards the release response message to the terminal.

Figure 5:
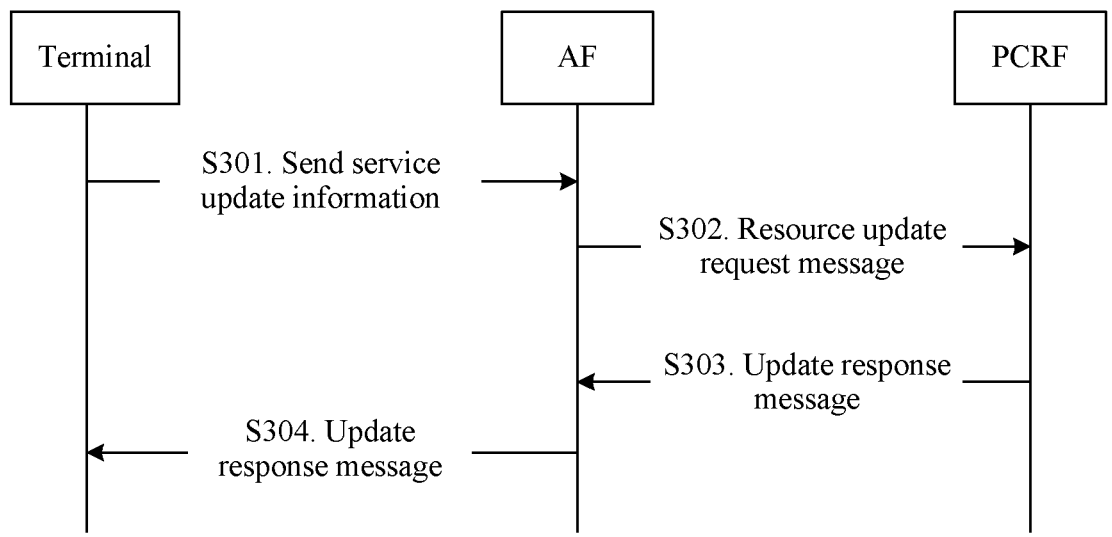
FIG. 5 is a flowchart of changing terminal service information according to an embodiment of the present invention.

This embodiment provides a specific implementation in which when binding duration of a terminal service expires, a terminal needs to apply for a QoS resource for the terminal service again. FIG. 5 is a flowchart of updating service information of a terminal according to an embodiment of the present invention. As shown in FIG. 5, the method in this embodiment includes the following steps.

S301. A terminal sends a service update message to an AF, where the service update message carries new service information, a type of the information carried in the service update message is the same as a type of the information carried in the service information in step 101, and details are not described herein again.

In an implementation, the foregoing service update message may carry all service information. In this case, the AF may not have a function of storing service information that is previously sent by the terminal.

For example, the service update message may carry quintuple information of the terminal service, configuration information of the terminal service, and the like.

In another implementation, the foregoing service update message may also carry only information that is in the service information and that needs to be updated by the terminal. In this case, the AF needs to have a function of storing service information that is previously sent by the terminal.

For example, only information, that is, binding duration of the terminal service, in the configuration information of the terminal service may be carried.

The foregoing service update message may be sent at any time point in a process of performing the terminal service, and a time and a scenario of sending the service update message is not limited in the present invention.

S302. After receiving the service update message sent by the terminal, the AF sends a resource update request message to a PCRF according to the service update message, where the resource update request message is used to request the PCRF to allocate a QoS resource to the terminal service again, information carried in the resource update request message is the same as a type of the information carried in the QoS resource request message in step 102, and details are not described herein again.

S303. After the PCRF receives the resource update request message sent by the AF, the PCRF performs processing that is the same as that in the foregoing step 103, where information carried in the message is the same as a type of the information carried in the request response message in step 103, and details are not described herein again; and then sends an update response message to the AF.

S304. The AF sends the received update response message to the terminal.

Implementations of the steps in this embodiment are similar to those in FIG. 3. Refer to descriptions in FIG. 3 for details. The details are not described herein again.

Figure 6:
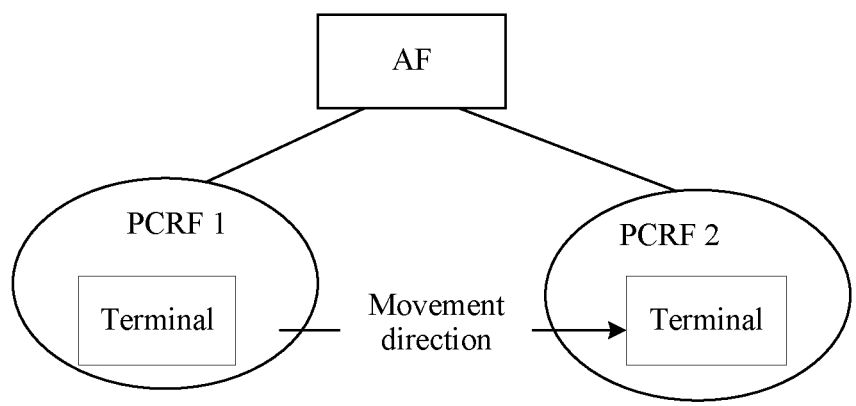
FIG. 6 is a schematic diagram of moving, by a terminal, from an area of a PCRF 1 to an area of a PCRF 2 according to an embodiment of the present invention.

Due to terminal mobility and a disaster recovery feature of a PCRF, a same terminal is in management ranges of different PCRFs at different times, and an AF needs to deliver a policy control message according to an area of a PCRF on which the terminal is currently located. As shown in FIG. 6, after the terminal moves from an area of a PCRF 1 to an area of a PCRF 2, the AF needs to send a QoS resource request message of the terminal service to the PCRF 2. Therefore, how the AF knows an area of a PCRF to which the terminal moves so as to send a QoS resource request message to the PCRF currently corresponding to the terminal is described.

Figure 7:
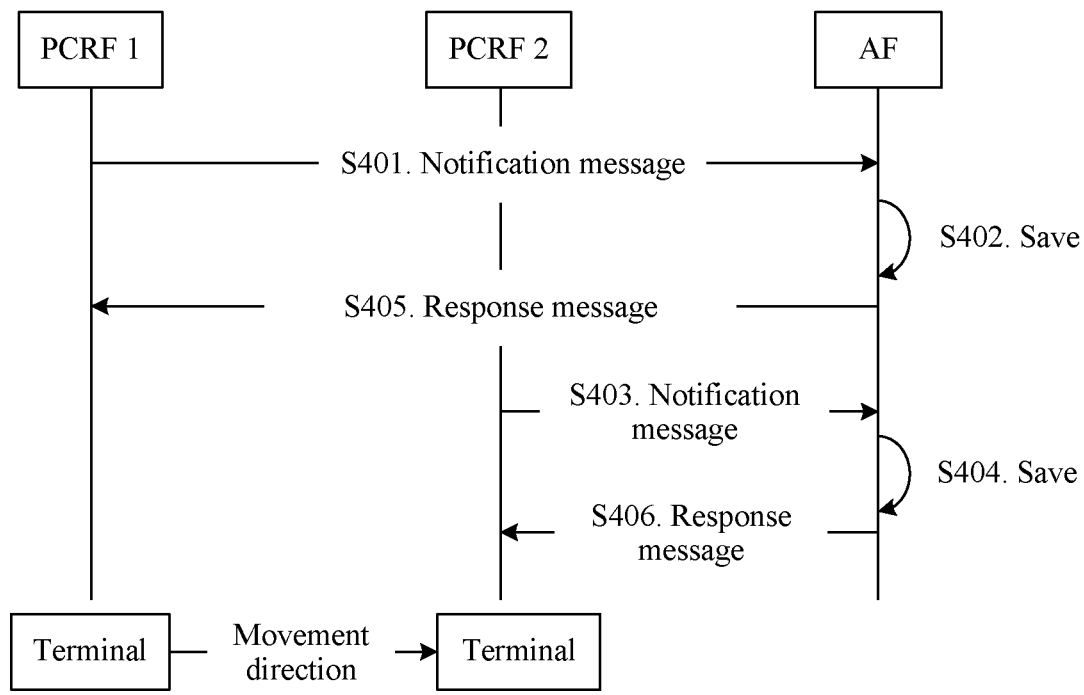
FIG. 7 is a schematic diagram of notifying, by a PCRF, an AF of a terminal that is in an area of the PCRF according to an embodiment.

In an implementation, a PCRF may actively notify the AF that the terminal is in an area of the PCRF. FIG. 7 is a schematic diagram of notifying, by a PCRF, an AF of a terminal that is in an area of the PCRF according to an embodiment. As shown in FIG. 7, two PCRFs: a PCRF 1 and a PCRF 2 are used as an example for description. Specifically:

S401. When the terminal starts a service, the PCRF 1 may obtain an identifier of the terminal, add address information of the PCRF 1 and the identifier of the terminal to a first notification message, and send the first notification message to the AF.

S402. The AF saves the received first notification message sent by the PCRF 1.

Specifically, the AF locally maintains an address relationship table, and the address relationship table is used to store a correspondence between the identifier of the terminal and address information of a PCRF corresponding to the terminal. After receiving the first notification message sent by the PCRF 1, the AF adds content carried in the first notification message to the locally maintained address relationship table.

After the terminal moves to an area of the PCRF 2, the PCRF 2 perceives that the terminal moves to the area covered by the PCRF 2, and performs the following step:

S403. The PCRF 2 obtains the identifier of the terminal, adds address information of the PCRF 2 and the identifier of the terminal to a second notification message, and sends the second notification message to the AF.

S404. The AF saves the received second notification message sent by the PCRF 2.

After receiving the second notification message sent by the PCRF 2, similarly, the AF adds content carried in the second notification message to the locally maintained address relationship table.

In an implementation, validity of an entry in the current address relationship table may be marked. For example, after the terminal moves from the area of the PCRF 1 to the area of the PCRF 2, a previously-stored entry in which the terminal is corresponding to the PCRF 1 is marked as invalid, then an entry in which the terminal is corresponding to the PCRF 2 is created, and the entry is marked as valid.

In another implementation, content of an entry in which the terminal is corresponding to the PCRF 2 may be used to directly cover content of an entry in which the terminal is corresponding to the PCRF 1.

Optionally, before S403 is performed, the AF may further perform the following step S405: The AF sends an response message to the PCRF 1, where the response message is used to notify the PCRF 1 that the notification message sent by the PCRF 1 has been successfully received.

Optionally, before S404 is performed, the AF may further perform the following step S406: The AF sends an response message to the PCRF 2, where the response message is used to notify the PCRF 2 that the notification message sent by the PCRF 2 has been successfully received.

In an example for description, the foregoing identifier of the terminal is a mobile subscriber international ISDN number (Mobile Subscriber International ISDN/PSTN number, MSISDN for short) and an international mobile subscriber identity (International Mobile Subscriber Identity, IMSI for short). The MSISDN is 138XXXX, the IMSI is 460xxx01, and the address information of the PCRF 1 is an IP address of the PCRF 1. Specifically:

S401. When the terminal enables a network access service, the PCRF 1 obtains an MSISDN and an IMSI of the terminal, and the PCRF 1 adds an IP address of the PCRF 1, the MSISDN that is 138XXXX, and the IMSI that is 460xxx01 to a notification message, and sends the notification message to the AF.

S402. The AF saves the received notification message sent by the PCRF 1, obtains, according to the MSISDN and the IMSI of the terminal and the IP address of the PCRF 1 that are carried in the notification message sent by the PCRF 1, an address relationship table shown in Table 1, and marks validity of an entry corresponding to the MSISDN of the terminal, the IMSI of the terminal, and the IP address of the PCRF 1 as Y.

TABLE 1

Address Relationship Table

| IMSI | MSISDN | PCRF address | Validity |
| --- | --- | --- | --- |
| 460xxx01 | 138XXXX | IP address of a PCRF 1 | Y |
| ... | ... | ... | ... |

S403. After the terminal moves to the area of the PCRF 2, the PCRF 2 obtains the MSISDN and the IMSI of the terminal, and the PCRF 2 adds an IP address of the PCRF 2, the MSISDN that is 138XXXX, and the IMSI that is 460xxx01 to a notification message, and sends the notification message to the AF.

S404. The AF saves the received notification message sent by the PCRF 2, and obtains, according to the MSISDN of the terminal, the IMSI of the terminal, and the IP address of the PCRF 2 that are carried in the notification message sent by the PCRF 2, an address relationship table shown in Table 2.

TABLE 2

Address Relationship Table

| IMSI | MSISDN | PCRF address | Validity |
| --- | --- | --- | --- |
| 460xxx01 | 138XXXX | IP address of a PCRF 1 | N |
| 460xxx01 | 138XXXX | IP address of a PCRF 2 | Y |
| ... | ... | ... | ... |

As shown in Table 2, an entry corresponding to the MSISDN of the terminal, the IMSI of the terminal, and the IP address of the PCRF 2 is newly added on the basis of Table 1, and validity of the entry corresponding to the MSISDN of the terminal, the IMSI of the terminal, and the IP address of the PCRF 1 is changed into N, and validity of the entry corresponding to the MSISDN of the terminal, the IMSI of the terminal, and the IP address of the PCRF 2 is marked as Y.

N indicates invalid, and Y indicates valid.

After the AF saves the foregoing address relationship table, after receiving service information sent by the terminal, the AF may determine, according to the stored address relationship table, a PCRF corresponding to the terminal. In this manner, the service information sent by the terminal to the AF further includes an identifier of the terminal, and the identifier of the terminal in this case may be corresponding to the identifier of the terminal that is in the address relationship table stored by the AF.

Specifically, after the AF receives the service information sent by the terminal, the AF determines, according to the identifier of the terminal and the address relationship table, address information of the PCRF corresponding to the terminal, and the address relationship table includes a correspondence between the identifier of the terminal and the address information of the PCRF corresponding to the terminal. Then, the AF sends, according to the address information of the PCRF corresponding to the terminal, a QoS resource request message to the PCRF corresponding to the address information of the PCRF corresponding to the terminal.

It should be noted that the foregoing manner of determining the PCRF corresponding to the terminal is only an example, and in actual application, the PCRF corresponding to the terminal may be determined according to any method in the prior art. This is not limited in the present invention.

The method provided in the present invention may be applied to a scenario of accelerating a terminal service, and that a user watches a video is used as an example for description.

When the user watches a video, playing modes of the video are classified into a fluent mode, a standard-definition mode, and a high-definition mode. If the user wants to watch a video in a high-definition mode, after the user taps the high-definition mode, a terminal sends service information to an AF, and the service information carries quintuple information of a terminal service, bandwidth required for playing the video in the high-definition mode, and a time for playing the video. After receiving the service information, the AF sends a QoS resource request message carried in the service information to a PCRF, so that the PCRF determines whether preconfigured bandwidth in the QoS resource request message can be allocated to a video service of the terminal, to enable the user to watch a high-definition video. When determining that the preconfigured bandwidth in the QoS resource request message can be allocated to the user, the PCRF sends a request response message to the AF, so that the user watches the high-definition video. In this case, the AF may forward this message to the terminal, and a screen of the terminal may display "Network speed is awesome, and welcome to watch a high-definition video". When determining that the preconfigured bandwidth in the QoS resource request message cannot be allocated to the user, the PCRF sends a request response message to the AF, and the request response message is used to notify the user that the user cannot watch a high-definition video. The AF forwards the message to the terminal. In this case, the terminal may display "Sorry, the high definition mode cannot be switched to, and please try it again later!" on a screen.

Figure 8:
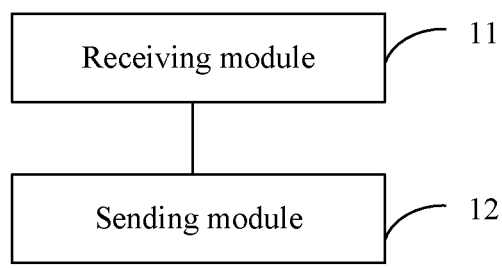
FIG. 8 is a first schematic structural diagram of a QoS resource allocation apparatus according to an embodiment of the present invention.

FIG. 8 is a first schematic structural diagram of a QoS resource allocation apparatus according to an embodiment of the present invention. As shown in FIG. 8, the QoS resource allocation apparatus includes:

a receiving module, configured to receive service information that is of a terminal service and that is sent by a terminal; and a sending module, configured to send a quality of service QoS resource request message to a policy and charging rules function PCRF unit corresponding to the terminal, where the QoS resource request message carries the service information, and the QoS resource request message is used to request the PCRF to allocate a QoS resource to the terminal service.

The receiving module is further configured to receive a request response message sent by the PCRF, and the request response message is used to indicate whether the QoS resource is successfully allocated to the terminal service.

Further, the service information includes at least one of the following information: a source port number of the terminal service, a destination port number of the terminal service, a source IP address of the terminal service, destination IP address network address information of the terminal service, a transmission protocol of the terminal service, or a service identifier of the terminal service.

Further, the service information further includes at least one of the following information: a priority of the terminal service, preconfigured bandwidth of the terminal service, or binding duration of the terminal service.

Optionally, the sending module is further configured to send configuration information of the terminal service to the terminal before the receiving module receives the service information sent by the terminal. The configuration information of the terminal service includes at least one of the following information: a priority of the terminal service, preconfigured bandwidth of the terminal service, or binding duration of the terminal service.

Optionally, the service information further includes the configuration information of the terminal service.

Figure 9:
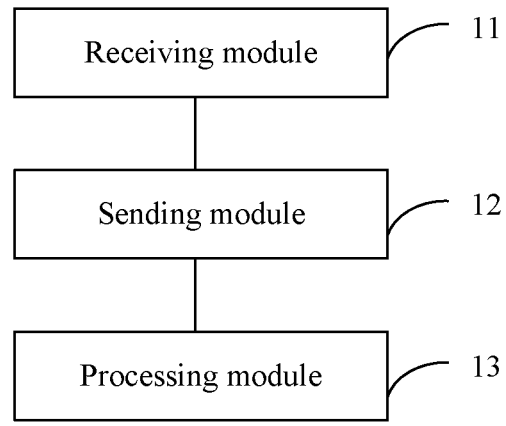
FIG. 9 is a second schematic structural diagram of a QoS resource allocation apparatus according to an embodiment of the present invention.

FIG. 9 is a second schematic structural diagram of a QoS resource allocation apparatus according to an embodiment of the present invention. As shown in FIG. 9, on the basis of FIG. 8, the foregoing QoS resource allocation apparatus further includes a determining module. The service information further includes an identifier of the terminal, and the determining module is configured to determine, according to the identifier of the terminal and an address relationship table, address information of a PCRF corresponding to the terminal. The address relationship table includes a correspondence between the identifier of the terminal and the address information of the PCRF corresponding to the terminal.

When sending the QoS resource request message to the PCRF corresponding to the terminal, the sending module is configured to send, according to the address information of the PCRF corresponding to the terminal, the QoS resource request message to the PCRF corresponding to the address information of the PCRF corresponding to the terminal.

Optionally, the receiving module is further configured to: before the determining module determines, according to the identifier of the terminal and the address relationship table, the address information of the PCRF corresponding to the terminal, receive a notification message sent by the PCRF corresponding to the terminal. The notification message carries the address information of the PCRF corresponding to the terminal and the identifier of the terminal.

The determining module is further configured to obtain the address relationship table according to the identifier of the terminal and the address information of the PCRF corresponding to the terminal.

Optionally, the receiving module is further configured to receive a request message sent by the terminal. The request message carries the service information of the terminal service, and the request message is used to request release of the QoS resource allocated to the terminal service.

The sending module is further configured to send a QoS resource release request message to the PCRF corresponding to the terminal.

The receiving module is further configured to: receive a release response message sent by the PCRF corresponding to the terminal, and forward the release response message to the terminal. The release response message is used to indicate that the QoS resource allocated to the terminal service has been released.

The apparatus in this embodiment may be configured to execute the technical solutions of the method embodiment shown in FIG. 3. Implementation principles and technical effects of the apparatus are similar to those of the method, and details are not described herein again.

Figure 10:
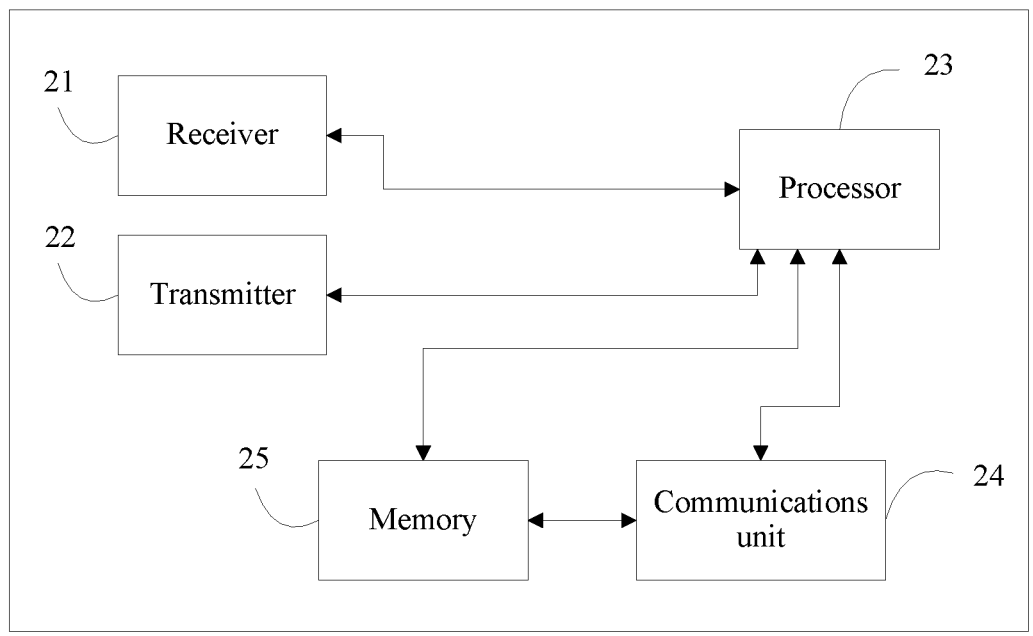
FIG. 10 is a possible schematic structural diagram of an AF related to the foregoing embodiments.

FIG. 10 is a possible schematic structural diagram of an AF related to the foregoing embodiments. As shown in FIG. 10, the AF includes a receiver 21, a transmitter 22, a processor 23, a communications unit 24, and a memory 25. The receiver 21 and the transmitter 22 are configured to support receiving and sending information between the AF and the terminal in the foregoing embodiments, and support receiving and sending information between the AF and the PCRF. The processor 23 performs various functions used to communicate with the terminal.

In an uplink, a signal sent to the AF by the terminal is received by an antenna, and is demodulated by the receiver 21, and further, the processor 23 processes the signal sent by the terminal to the AF, to restore service data and a signaling message that are sent by the terminal to the AF. In a downlink, the service data and the signaling message are processed by the processor 23, and are demodulated by the transmitter 22 to generate a downlink signal, and the downlink signal is transmitted to the terminal by using the antenna. The processor 23 further performs a processing process related to a base station in FIG. 4 to FIG. 9 and/or another process of a technology described in this application. The memory 25 is configured to store program code and data of the AF. The communications unit 24 is configured to support communication between the AF and another network entity, for example, is configured to support communication between the AF and another communications network entity shown in FIG. 3 to FIG. 7, such as the PCRF.

It may be understood that FIG. 10 shows only a simplified design of the AF. In actual application, the AF may include any quantity of transmitters, receivers, processors, controllers, memories, communications units, or the like, and all base stations that can implement the present invention are within the protection scope of the present invention.

Further, the functional modules of the AF in FIG. 10 are specifically configured to:

The receiver 21 is configured to receive service information that is of a terminal service and that is sent by a terminal.

The transmitter 22 is configured to send a quality of service QoS resource request message to a policy and charging rules function PCRF unit corresponding to the terminal. The QoS resource request message carries the service information, and the QoS resource request message is used to request the PCRF to allocate a QoS resource to the terminal service.

The receiver 21 is further configured to receive a request response message sent by the PCRF, and the request response message is used to indicate whether the QoS resource is successfully allocated to the terminal service.

Optionally, the service information includes at least one of the following information: a source port number of the terminal service, a destination port number of the terminal service, a source IP address of the terminal service, destination IP address network address information of the terminal service, a transmission protocol of the terminal service, or a service identifier of the terminal service.

Further, the foregoing service information further includes at least one of the following information: a priority of the terminal service, preconfigured bandwidth of the terminal service, or binding duration of the terminal service.

Optionally, the transmitter 22 is further configured to send configuration information of the terminal service to the terminal before the receiver 21 receives the service information sent by the terminal. The configuration information of the terminal service includes at least one of the following information: a priority of the terminal service, preconfigured bandwidth of the terminal service, or binding duration of the terminal service.

Optionally, the foregoing service information further includes the configuration information of the terminal service.

Further, the service information further includes an identifier of the terminal, and the processor 23 is configured to determine, according to the identifier of the terminal and an address relationship table, address information of a PCRF corresponding to the terminal. The address relationship table includes a correspondence between the identifier of the terminal and the address information of the PCRF corresponding to the terminal.

When sending the QoS resource request message to the PCRF corresponding to the terminal, the transmitter 22 is configured to send, according to the address information of the PCRF corresponding to the terminal, the QoS resource request message to the PCRF corresponding to the address information of the PCRF corresponding to the terminal.

Optionally, the receiver 21 is further configured to: before the processor 23 determines, according to the identifier of the terminal and the address relationship table, the address information of the PCRF corresponding to the terminal, receive a notification message sent by the PCRF corresponding to the terminal. The notification message carries the address information of the PCRF corresponding to the terminal and the identifier of the terminal.

The processor 23 is further configured to obtain the address relationship table according to the identifier of the terminal and the address information of the PCRF corresponding to the terminal.

Optionally, the receiver 21 is further configured to receive a request message sent by the terminal. The request message carries the service information of the terminal service, and the request message is used to request release of the QoS resource allocated to the terminal service.

The transmitter 22 is further configured to send a QoS resource release request message to the PCRF corresponding to the terminal.

The receiver 21 is further configured to: receive a release response message sent by the PCRF corresponding to the terminal, and forward the release response message to the terminal. The release response message is used to indicate that the QoS resource allocated to the terminal service has been released.

The apparatus in this embodiment may be configured to execute the technical solutions of the method embodiment shown in FIG. 3. Implementation principles and technical effects of the apparatus are similar to those of the method, and details are not described herein again.

It should be noted that, for ease of description, the foregoing method embodiments are described as a series of action combinations. However, persons skilled in the art should understand that the present invention is not limited to the described sequence of the actions, because some steps may be performed in another sequence or performed at the same time according to the present invention. In addition, persons skilled in the art should also appreciate that all the embodiments described in the specification are preferred embodiments, and the related actions and modules are not necessarily mandatory to the present invention.

In the foregoing embodiments, the description of each embodiment has respective focuses. For a part that is not described in detail in an embodiment, refer to related descriptions in other embodiments.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A quality of service (QoS) resource allocation method, comprising:
    receiving service information from a terminal, wherein the service information comprises an identifier of the terminal and configuration information of a terminal service;
    determining, according to the identifier of the terminal and an address relationship table, address information of a policy and charging rules function (PCRF) network element, wherein the address relationship table comprises a correspondence between the identifier of the terminal and the address information of the PCRF network element;

sending, according to the address information of the PCRF network element, a QoS resource request message to the PCRF network element, wherein the QoS resource request message comprises the service information, and wherein the QoS resource request message requests allocation of a QoS resource to the terminal service; and receiving a request response message from the PCRF network element, wherein the request response message indicates whether the QoS resource is allocated to the terminal service.

2. The method of claim 1, wherein the service information comprises one of the following:
   a source port number of the terminal service;
   destination IP address network address information of the terminal service;
   a transmission protocol of the terminal service; or
   a service identifier of the terminal service.

3. The method of claim 1, wherein the service information further comprises a priority of the terminal service.

4. The method of claim 1, wherein before receiving the service information, the method further comprises sending configuration information of the terminal service to the terminal, and the configuration information of the terminal service comprises:
   preconfigured bandwidth of the terminal service; or
   binding duration of the terminal service.

5. The method of claim 1, wherein before determining the address information of the PCRF network element corresponding to the terminal, the method further comprises:
   receiving a notification message from the PCRF network element corresponding to the terminal, wherein the notification message comprises the address information of the PCRF network element corresponding to the terminal and the identifier of the terminal; and
   obtaining the address relationship table according to the identifier of the terminal and the address information of the PCRF network element corresponding to the terminal.

6. The method of claim 5, further comprising:
   receiving a request message from the terminal, wherein the request message comprises the service information of the terminal service, and wherein the request message requests release of the QoS resource allocated to the terminal service;
   sending a QoS resource release request message to the PCRF network element corresponding to the terminal;
   receiving a release response message from the PCRF network element corresponding to the terminal; and
   forwarding the release response message to the terminal, wherein the release response message indicates that the QoS resource allocated to the terminal service has been released.

7. A quality of service (QoS) resource allocation apparatus, comprising:
   a receiver configured to receive service information from a terminal, wherein the service information comprises an identifier of the terminal and configuration information of a terminal service;
   a transmitter coupled to the receiver and configured to send a QoS resource request message to a policy and charging rules function (PCRF) network element corresponding to the terminal, wherein the QoS resource request message comprises the service information, and wherein the QoS resource request message requests allocation of a QoS resource to the terminal service, wherein the receiver is further configured to receive a request response message from the PCRF network element, and wherein the request response message indicates whether the QoS resource is allocated to the terminal service; and
   a processor coupled to the receiver and the transmitter, wherein the processor is configured to determine, according to the identifier of the terminal and an address relationship table, address information of the PCRF network element corresponding to the terminal, wherein the transmitter is further configured to send, according to the address information of the PCRF network element corresponding to the terminal, the QoS resource request message to the PCRF network element corresponding to the terminal.

8. The apparatus of claim 7, wherein the service information comprises at least one of the following information:
   a source port number of the terminal service;
   a source Internet Protocol (IP) address of the terminal service;
   destination IP address network address information of the terminal service; or
   a service identifier of the terminal service.

9. The apparatus of claim 8, wherein the service information further comprises a priority of the terminal service.

10. The apparatus of claim 7, wherein the transmitter is further configured to send configuration information of the terminal service to the terminal before the receiver receives the service information from the terminal, and wherein the configuration information of the terminal service comprises;
    preconfigured bandwidth of the terminal service; or
    binding duration of the terminal service.

11. The apparatus of claim 10, wherein the receiver is further configured to receive a notification message from the PCRF network element corresponding to the terminal before the processor determines the address information of the PCRF network element corresponding to the terminal, wherein the notification message comprises the address information of the PCRF network element corresponding to the terminal and the identifier of the terminal, and wherein the processor is further configured to obtain the address relationship table according to the identifier of the terminal and the address information of the PCRF network element corresponding to the terminal.

12. The apparatus of claim 11, wherein the receiver is further configured to receive a request message from the terminal, wherein the request message comprises the service information of the terminal service, wherein the request message requests release of the QoS resource allocated to the terminal service, wherein the transmitter is further configured to send a QoS resource release request message to the PCRF network element corresponding to the terminal, and wherein the receiver is further configured to:
    receive a release response message from the PCRF network element corresponding to the terminal; and
    forward the release response message to the terminal, wherein the release response message indicates that the QoS resource allocated to the terminal service has been released.

13. The method of claim 2, wherein the service information further comprises information of preconfigured bandwidth of the terminal service.

14. The method of claim 2, wherein the service information further comprises information of binding duration of the terminal service.

15. The apparatus of claim 8, wherein the service information further comprises information of preconfigured bandwidth of the terminal service.

16. The apparatus of claim 8, wherein the service information further comprises information of binding duration of the terminal service.

17. The method of claim 1, wherein the service information further comprises a destination port number of the terminal service.

18. The method of claim 1, wherein the service information further comprises a source Internet Protocol (IP) address of the terminal service.

19. The apparatus of claim 7, wherein the service information further comprises a destination port number of the terminal service.

20. The apparatus of claim 7, wherein the service information further comprises a transmission protocol of the terminal service.

* * * * *

UNITED STATES PATENT AND TRADEMARK OFFICE
CERTIFICATE OF CORRECTION

PATENT NO.       : 10,813,101 B2
APPLICATION NO.  : 16/301297
DATED            : October 20, 2020
INVENTOR(S)      : Yu Deng et al.

It is certified that error appears in the above-identified patent and that said Letters Patent is hereby corrected as shown below:

On the Title Page

Page 2, Column 1: "2017/0027012 A1 1/2017 Chat et al." should read "2017/0027012 A1 1/2017 Chai et al."

Signed and Sealed this
Twenty-fourth Day of November, 2020

Andrei Iancu
*Director of the United States Patent and Trademark Office*